(12) United States Patent
Warden

(10) Patent No.: US 9,635,056 B2
(45) Date of Patent: Apr. 25, 2017

(54) CABLE MANAGEMENT AND SECURITY SYSTEM

(71) Applicant: Dell Products L.P., Round Rock, TX (US)

(72) Inventor: David Matthew Warden, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 62 days.

(21) Appl. No.: 14/278,101

(22) Filed: May 15, 2014

(65) Prior Publication Data

US 2015/0334166 A1 Nov. 19, 2015

(51) Int. Cl.
*H04L 29/06* (2006.01)
*H04L 29/08* (2006.01)
*H04L 12/24* (2006.01)
*H04L 12/26* (2006.01)

(52) U.S. Cl.
CPC .......... *H04L 63/20* (2013.01); *H04L 41/085* (2013.01); *H04L 67/10* (2013.01); *H04L 43/087* (2013.01); *H04L 43/0811* (2013.01); *H04L 63/0428* (2013.01); *H04L 63/061* (2013.01); *H04L 63/0823* (2013.01)

(58) Field of Classification Search
None
See application file for complete search history.

(56) References Cited

U.S. PATENT DOCUMENTS

| | | | | |
|---|---|---|---|---|
| 6,230,214 B1* | 5/2001 | Liukkonen | ......... | H04B 10/1143 398/9 |
| 6,704,824 B1* | 3/2004 | Goodman | ............. | G06F 13/385 703/24 |
| 7,349,719 B2* | 3/2008 | Buniatyan | ........... | G06F 11/1456 455/414.1 |
| 7,520,782 B1* | 4/2009 | Huang | ................... | H01R 31/06 439/516 |
| 7,574,532 B2* | 8/2009 | Wang | ................. | H04N 1/00204 710/62 |
| 8,258,973 B2* | 9/2012 | Newkirk | ................ | A61G 7/012 340/573.1 |
| 8,326,939 B2* | 12/2012 | Ueno | .................... | G06F 3/0604 709/201 |
| 2002/0044654 A1* | 4/2002 | Maeda | ................... | H04H 60/19 380/43 |

(Continued)

*Primary Examiner* — Farid Homayounmehr
*Assistant Examiner* — Maung Lwin
(74) *Attorney, Agent, or Firm* — Haynes and Boone, LLP

(57) ABSTRACT

A cable management system includes a cable that transmits data between information handling systems (IHSs). The cable includes a first end and a second end that is opposite the cable from the first end. A first connector is located on the first end of the cable and couples the cable to a first IHS. A second connector is located on the second end of the cable and couples the cable to a second IHS. A first communication system is located adjacent the first end of the cable. The first communication system receives and stores first IHS information about the first IHS when the first connector is coupled to the first IHS and second IHS information about the second IHS when the second connector is coupled to the second IHS. The first communication system may then provide the first and second IHS information to a management device.

20 Claims, 9 Drawing Sheets

(56) References Cited

U.S. PATENT DOCUMENTS

| | | | |
|---|---|---|---|
| 2009/0052345 A1* | 2/2009 | Brown | H04L 49/35 370/254 |
| 2009/0327727 A1* | 12/2009 | Meijer | G06F 21/31 713/170 |
| 2010/0268860 A1* | 10/2010 | Nikazm | G06F 3/00 710/105 |
| 2010/0295960 A1* | 11/2010 | Furlan | H01R 13/6683 348/222.1 |
| 2011/0054732 A1* | 3/2011 | Jardine | H01R 31/065 701/31.4 |
| 2011/0093642 A1* | 4/2011 | Miyasaka | G06F 13/4022 710/316 |
| 2011/0205581 A1* | 8/2011 | Machii | H04L 41/082 358/1.15 |
| 2011/0219147 A1* | 9/2011 | Diab | G06F 12/00 710/8 |
| 2012/0030455 A1* | 2/2012 | McLaughlin | G06F 13/40 713/2 |
| 2013/0138942 A1* | 5/2013 | Klose | G06F 9/44505 713/2 |
| 2013/0148976 A1* | 6/2013 | Patel | H04B 10/25 398/116 |
| 2013/0163604 A1* | 6/2013 | Kondapalli | H04L 49/602 370/401 |
| 2013/0181816 A1* | 7/2013 | Carlson, Jr. | G09F 3/205 340/10.1 |
| 2013/0254580 A1* | 9/2013 | Yan | G06F 1/266 713/340 |
| 2013/0268309 A1* | 10/2013 | Fujita | G06Q 50/08 705/7.13 |
| 2013/0343764 A1* | 12/2013 | Coffey | G02B 6/43 398/135 |
| 2014/0075210 A1* | 3/2014 | Rich | G06F 1/1632 713/300 |
| 2014/0348468 A1* | 11/2014 | Lagziel | G02B 6/381 385/78 |

\* cited by examiner

CABLE INVENTORY

| CABLE ID 706a | LENGTH 706b | QUALITY 706c | CONNECTED DEVICES 706d | ERRORS? 706e | LATENCY 706f |
|---|---|---|---|---|---|
| 123456 | 5 meter | CAT-5 | SERVER12; SWITCH2 | NONE | 3ns |
| 856214 | 10 meter | CAT-3 | SERVER14; SWITCH4 | NONE | 6ns |
| 458595 | 25 meter | CAT-5 | NONE | NONE | N/A |
| 947583 | 15 meter | CAT-6 | STORAGE3; SWTICH24 | YES | 100ns |
| 795418 | 50 meter | CAT-5 | SERVER8; SWITCH1 | NONE | 150ns |
| 625498 | 5 meter | CAT-3 | SERVER8; SWITCH6 | NONE | 120ns |
| 345685 | 10 meter | CAT-5 | SERVER1; STORAGE12 | NONE | 6ns |
| 254685 | 15 meter | CAT-3 | STORAGE12; SWITCH31 | NONE | 9ns |
| 195648 | 5 meter | CAT-6 | SERVER13; NONE | NONE | 250ns |
| 741025 | 25 meter | CAT-5 | SERVER7; SWITCH11 | NONE | 75ns |
| 265984 | 50 meter | CAT-5 | SWITCH12; SWITCH2 | NONE | 150ns |
| 489613 | 10 meter | CAT-5 | SWITCH4; STORAGE2 | NONE | 60ns |
| 948596 | 10 meter | CAT-5 | SERVER19; SWITCH23 | NONE | 6ns |

MANAGEMENT IHS 700

FIG. 7

SWITCH IHS 302/CABLE CONNECTIVITY

| PORT ID | CABLE ID | LENGTH | CONNECTED DEVICE | ERRORS? | LATENCY |
|---|---|---|---|---|---|
| 0 | 123456 | 5 meter | SERVER12 | NONE | 3ns |
| 1 | 945148 | 10 meter | SERVER14 | NONE | 6ns |
| 2 | 897450 | 25 meter | NONE | NONE | N/A |
| 3 | 634608 | 15 meter | STORAGE3 | YES | 300ns |
| 5 | 201984 | 50 meter | SERVER8 | NONE | 150ns |
| 5 | 670546 | 5 meter | SERVER8 | NONE | 200ns |
| 6 | 748132 | 10 meter | SERVER1 | NONE | 6ns |
| 7 | 689456 | 15 meter | STORAGE12 | NONE | 9ns |
| 8 | 548949 | 5 meter | SERVER13 | NONE | 3ns |
| 9 | 849865 | 25 meter | SERVER7 | NONE | 75ns |
| 10 | 789452 | 50 meter | NONE | NONE | N/A |
| 11 | 1554984 | 10 meter | SWITCH33 | NONE | 250ns |
| 12 | 874946 | 10 meter | SERVER19 | NONE | 6ns |

MANAGEMENT IHS 700

FIG. 8

CABLE MANAGEMENT AND SECURITY SYSTEM

BACKGROUND

The present disclosure relates generally to information handling systems, and more particularly to the management and security of cables used for connecting information handling systems.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs are typically connected to each other using cables. For example, switch IHSs may connect to IHSs such as server IHSs, storage IHS, and/or a wide variety of other IHSs known in the art using networking cables such as Ethernet cables, Fibre Channel cables, and/or a wide variety of other cables or cabling systems known in the art. The management of such cables is often a challenge, particularly in large IHS networks such as data centers, as once a cable has been connected to a first IHS in a data center, it may be unclear which second IHS is connected to the other end of that cable. Furthermore, as IHSs are added, removed, and/or reconfigured in the data center, it can become complicated and time consuming to ensure that cables are properly connecting IHSs in the data center, and cables may be left unused (e.g., deployed in the data center, but unconnected to an IHS on at least one end, unconnected to IHSs on either end, etc.) without the knowledge of a data center administrator. Further still, even when unused cables are properly stored in the data center, the length and/or quality of any particular cable may be difficult or time consuming to determine. The lack of management of cables in a data center results in wasted resources and can pose a security risk, as unauthorized cables may be connected to IHSs in the data center without the data center administrator's knowledge, allowing unauthorized devices access to IHSs in the data center.

Accordingly, it would be desirable to provide an improved cable management and security system.

SUMMARY

According to one embodiment, an information handling system (IHS) network includes a first IHS; a second IHS; a cable connecting the first IHS and the second IHS, wherein the cable includes: a first connector that is located on a first end of the cable and that connects the cable to the first IHS; a second connector that is located on a second end of the cable and that connects the cable to the second IHS; and a first communication system that is located adjacent the first end of the cable, wherein the first communication system stores first IHS information about the first IHS and second IHS information about the second IHS, and wherein the first communication system is configured to provide the first IHS information and the second IHS information to a management device.

BRIEF DESCRIPTION OF THE DRAWINGS

FIG. 7 is a screen shot illustrating an embodiment of a cable inventory screen displayed on a management IHS.

FIG. 8 is a screen shot illustrating an embodiment of an IHS/cable connectivity screen displayed on a management IHS.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
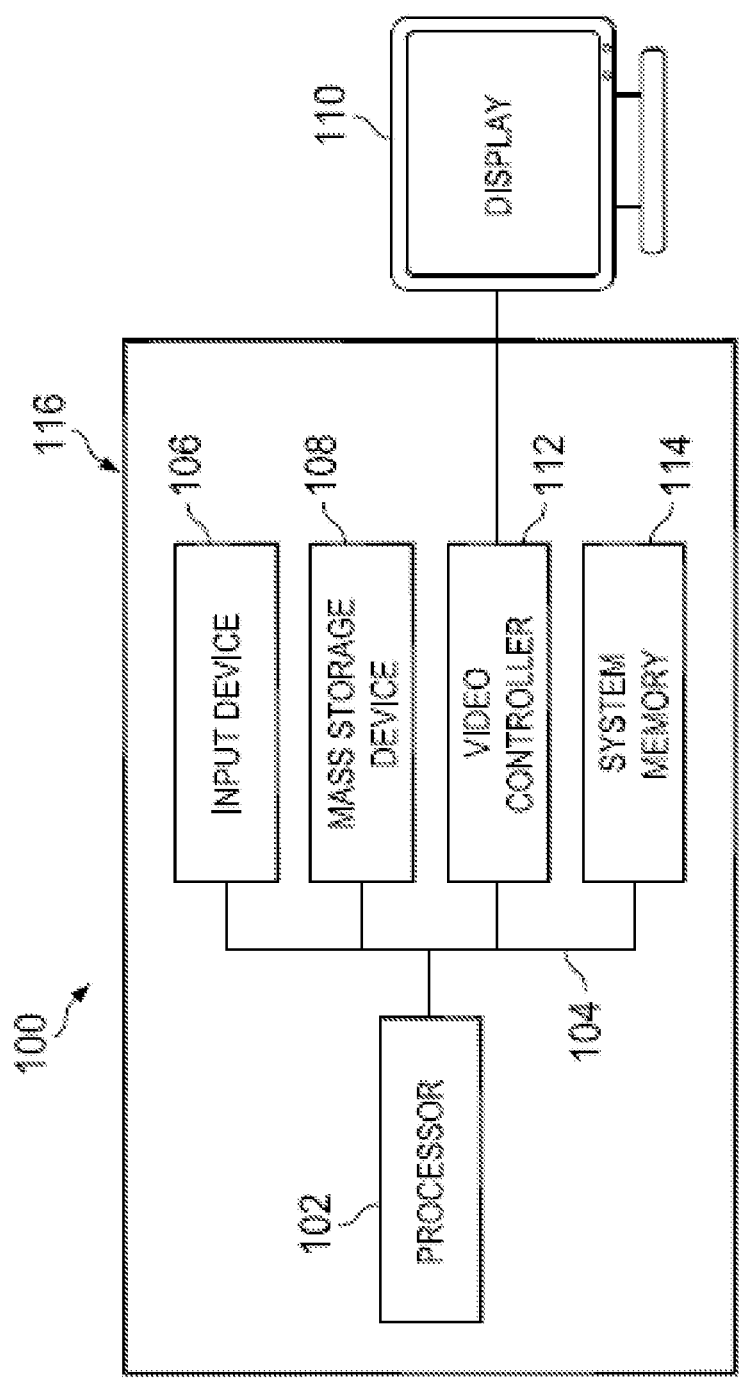
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mice, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
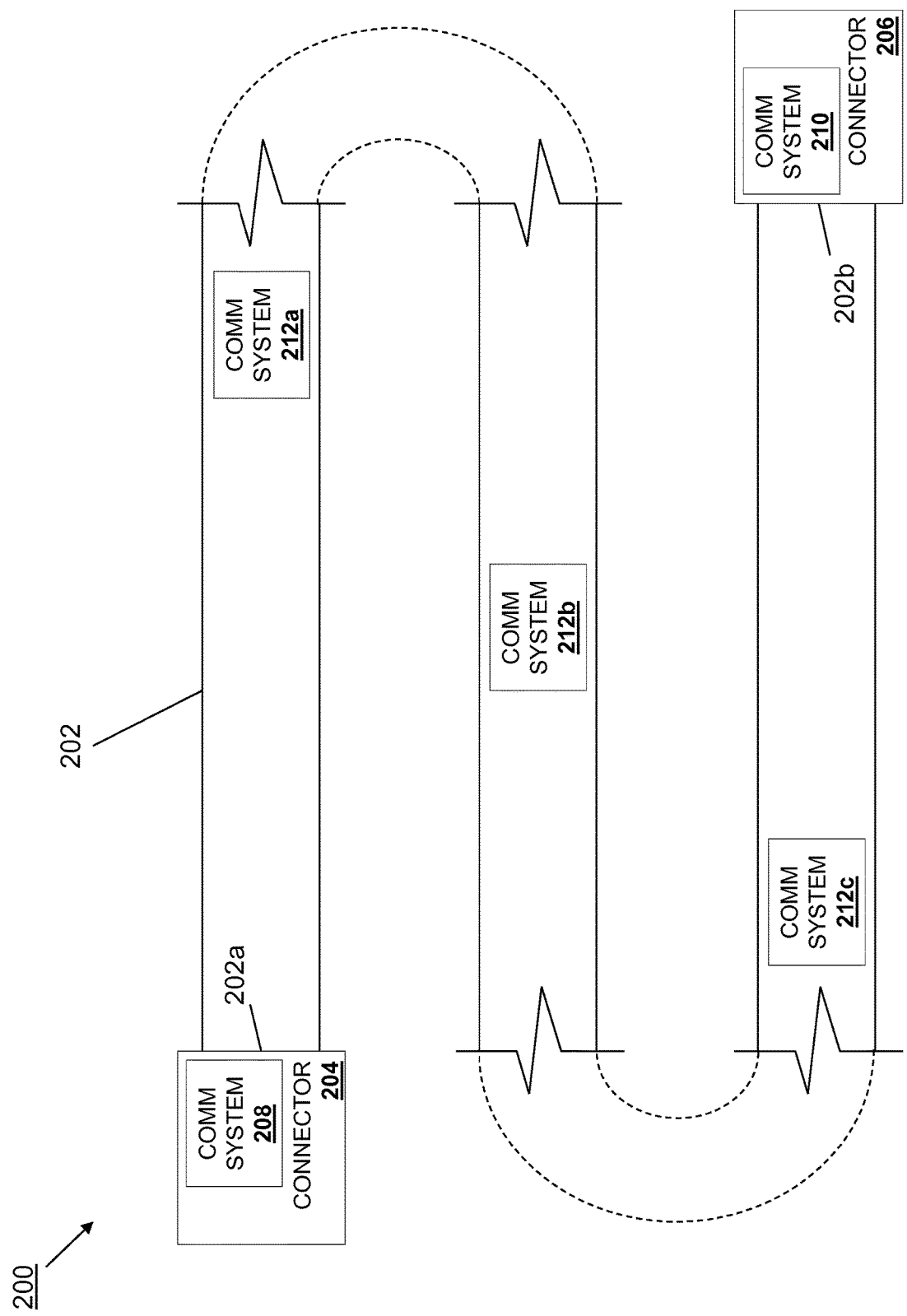
FIG. 2 is a schematic view illustrating an embodiment of a cable.

Referring now to FIG. 2, an embodiment of a cable 200 is illustrated. The cable 200 includes an elongated cable body 202 having a first end 202a and a second end 202b that is located opposite the cable body 202 from the first end 202a. As is known in the art, the cable body 202 may include a conductive transmission medium (e.g., a copper wire), fiber optic transmission medium (e.g., a fiber optic cable), and/or a variety of other data transmission mediums known in the art, surrounded by a variety of different types of dielectric layers, shielding layers, and/or other protective layers known in the art. A connector 204 is located on the first end 202a of the cable body 202 and connected to the data transmission medium in the cable body 202, and a connector 206 is located on the second end 202b of the cable body 202 and connected to the data transmission medium in the cable body 202. The connectors 204 and 206 may include Ethernet cable connectors that are configured to couple to Ethernet ports, Fibre Channel connectors that are configured to couple to Fibre Channel ports, and/or a variety of other types of connectors known in the art that are configured to couple to communication ports on an IHS. As is known in the art, the cable 200 may include a length (e.g., 5 meter, 10 meter, 25 meter, 50 meter, etc.) and quality characteristics such as a category characteristic (e.g., category 3, 5, 5e, 6, 6a, and/or 7 for Ethernet cables), a connector characteristic (RJ-45 or GigaGate45 (GG45) for Ethernet connectors), a transmission rate characteristic (e.g., 1 GB, 10 GB, etc.), a data transmission medium characteristics (e.g., unshielded twisted pair, shielded twisted pair, etc.), and/or a variety of other cable quality characteristics known in the art.

The cable 200 also includes one or more communication systems. In the illustrated embodiment, a communication system 208 is included in the connector 204, a communication system 210 is included in the connector 206, and a plurality of communication systems 212a, 212b, and 212c are included in the cable body 202 at different positions along its length between the first end 202a and the second end 202b. In some embodiments, the communication systems 212a-c may not be included in the cable body 202 such that cable 200 only includes the communication systems 208 and 210 in the connectors 204 and 206, respectively. Furthermore, while the communication systems 208 and 210 are illustrated and described as included in the connectors 204 and 206, the communication systems 204 and 206 may instead be included in the cable body 202 adjacent the first end 202a and the second end 202b while remaining within the scope of the present disclosure. In the embodiments discussed below, the communication systems 208, 210, and/or 212a-c are provided using Near Field Communication (NFC) systems that may each include an NFC processing device, an NFC memory device, and/or a variety of other NFC components known in the art. However, other communication systems such as, for example, Bluetooth communication systems, Bluetooth Low Energy (BLE) communication systems, Wi-Fi Direct communication systems, and/or a variety of other communication systems capable of providing the functionality discussed below are envisioned as falling within the scope of the present disclosure.

In some embodiments, the communication systems 208, 210, 212a, 212b, and/or 212c may be provided with cable information about the cable 200 for storage. For example, during the manufacture of the cable 200, prior to the sale of the cable 200, prior to the deployment of the cable 200 in an IHS network (discussed below), during or subsequent to the deployment of the cable 200 in an IHS network, and/or at a variety of other times that will be apparent to one of skill in the art in possession of the present disclosure, the communication systems 208, 210, 212a, 212b, and/or 212c may be used to receive and store cable information that may include a cable identifier identifying and/or distinguishing the cable from other cables, cable length information that describes the length of the cable 200; cable quality information that describes the category characteristic of the cable 200, the connector characteristic of the cable 200, the transmission rate characteristic of the cable 200, the data transmission medium characteristic of the cable 200, the rated bandwidth of the cable 200, and/or a variety of other cable quality characteristics known in the art; and/or any other information about the cable that is available prior to the deployment of the cable 200 in an IHS network to couple together IHSs. As such, the communication systems 208, 210, 212a, 212b, and/or 212c in the cable 200 may store cable information that provides details about the cable 200. In some embodiments, that cable information may be stored in a write-protected area of the communication system memory such that it cannot be written over or otherwise erased.

The communications systems 208, 210, and 212a-c may be powered in a variety of ways. In some embodiments, one or more of the communication systems in the cable 200 may be powered using a battery or other portable power supply. In some embodiments, one of more of the communication systems may be powered through the connectors 204 and 206. For example, the connectors 204 and 206 may be configured to receive power through ports on an IHS when the connectors 204 and 206 are coupled to those ports (discussed in further detail below), and those connectors 204 and 206 may provide power received through the ports to the communication systems 208 and 210, respectively. In some embodiments, one of more of the communication systems may be powered through a power transmission medium in the cable 200. For example, the cable 200 may be a Power over Ethernet (PoE, PoE+, etc.) cable that is configured to receive power through ports on an IHS when the connectors 204 and 206 are coupled to those ports (discussed in further detail below) and transmit that power over the data/power transmission medium in the cable body 202, and the communication systems 208, 210, 212a, 212b, and/or 212c may be coupled to the data/power transmission medium such that they may draw power from it. In other embodiments, the communication systems may be powered by a radio frequency (RF) field generated by a management device (discussed below), an IHS initiating communications, and/or other RF field generating systems known in the art. For example, the communication systems may operate in a passive communication mode that conforms to the NFC protocol and draws power from the initiator-provided electromagnetic field. While a few examples have been provided, one of skill in the art in possession of the present disclosure will recognize that they communication systems may be powered in a variety of manners known in the art while remaining within the scope of the present disclosure.

Figure 3:
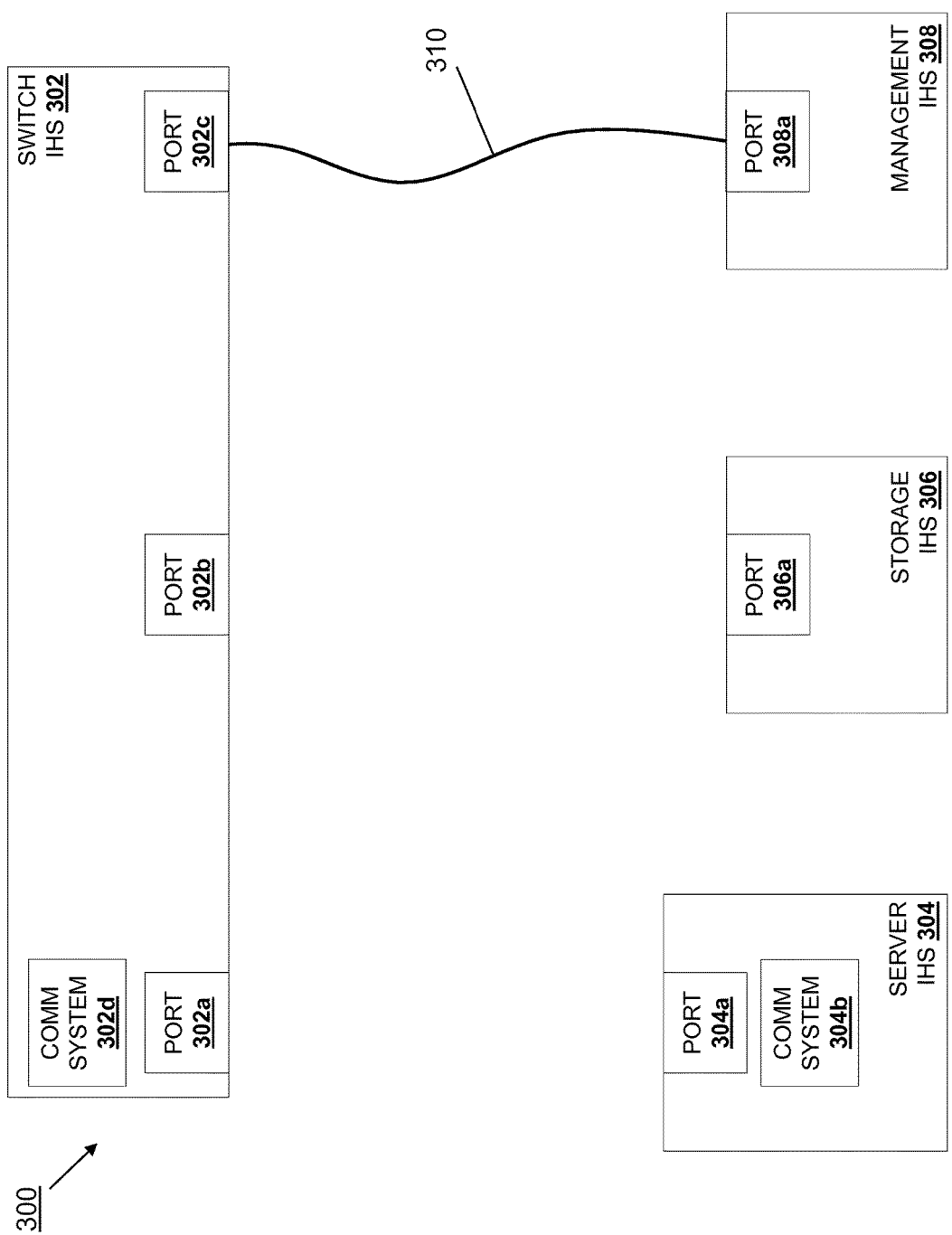
FIG. 3 is a schematic view illustrating an embodiment of an IHS network.

Referring now to FIG. 3, an embodiment of an IHS network 300 is illustrated. In the illustrated embodiment, the IHS network 300 includes a switch IHS 302, a server IHS 304, a storage IHS 306, and a management IHS 308. One of skill in the art in possession of the present disclosure will recognize that the IHS network 300 in the illustrated embodiment is a simplified example of a data center, and that a plurality of additional and/or other types of IHSs may be included in the IHS network 300 while remaining within the scope of the present disclosure. The switch IHS 302 includes a plurality of ports 302a, 302b, and 302c which may be, for example, Ethernet ports, Fibre Channel ports, and/or a wide variety of other types of ports known in the art. The switch IHS 302 also includes a communication system 302d that is located adjacent the port 302a. While only one communication system 302d is illustrated and described below as being provided adjacent the port 302a in the switch IHS 302 in order to illustrate the operation of the cable management and security system of the present disclosure in different embodiments (i.e., with and without communication systems adjacent the ports in the switch IHS 302), any or all of the ports in the switch IHS may include a similar communication system and/or be free of a communication system while remaining within the scope of the present disclosure. In the embodiments discussed below, the communication system 302d is provided using an NFC system that may include an NFC processing device, an NFC memory device, and/or a variety of other NFC components known in the art. However, other communication systems such as, for example, Bluetooth communication systems, Bluetooth Low Energy (BLE) communication systems, WiFi Direct communication systems, and/or a variety of other communication systems capable of providing the functionality discussed below are envisioned as falling within the scope of the present disclosure.

The server IHS 304 includes a port 302a which may be, for example, an Ethernet port, a Fibre Channel port, and/or a wide variety of other types of ports known in the art. The server IHS 304 also includes a communication system 304b that is located adjacent the port 304a. While only one port 304a and associated communication system 304b are illustrated and described below as being included in the server IHS 304, one of skill in the art in possession of the present disclosure will recognize that the server IHS 304 may include a plurality of ports, each of which may include or be free of an associated communication system while remaining within the scope of the present disclosure. In the embodiments discussed below, the communication system 304b is provided using an NFC system that may include an NFC processing device, an NFC memory device, and/or a variety of other NFC components known in the art. However, other communication systems such as, for example, Bluetooth communication systems, Bluetooth Low Energy (BLE) communication systems, Wifi Direct communication systems, and/or a variety of other communication systems capable of providing the functionality discussed below are envisioned as falling within the scope of the present disclosure.

The storage IHS 306 includes a port 306a which may be, for example, an Ethernet port, a Fibre Channel port, and/or a wide variety of other types of ports known in the art. While the storage IHS 306 is illustrated and described as including the single port 306a without an associated communication system (e.g., similar to the communication system 304b in the server IHS 304), one of skill in the art in possession of the present disclosure will recognize that the storage IHS 306 may include a plurality of ports, each of which may include or be free of an associated communication system while remaining within the scope of the present disclosure. The management IHS 308 includes a port 308a which may be, for example, an Ethernet port, a Fibre Channel port, and/or a wide variety of other types of ports known in the art. While the management IHS 308 is illustrated and described as including the single port 308a without an associated communication system (e.g., similar to the communication system 304b in the server IHS 304), one of skill in the art in possession of the present disclosure will recognize that the management IHS 308 may include a plurality of ports, each of which may include or be free of an associated communication system while remaining within the scope of the present disclosure. In the illustrated embodiment, the switch IHS 302 and the management IHS 308 are illustrated and described as being coupled together via a management cable 310 that is connected to each of the port 302c on the switch IHS 302 and the port 308a on the management IHS 308. However, the switch IHS 302 and the management IHS 308 may be coupled together via a variety of different devices, systems, and networks while remaining within the scope of the present disclosure.

Figure 4:
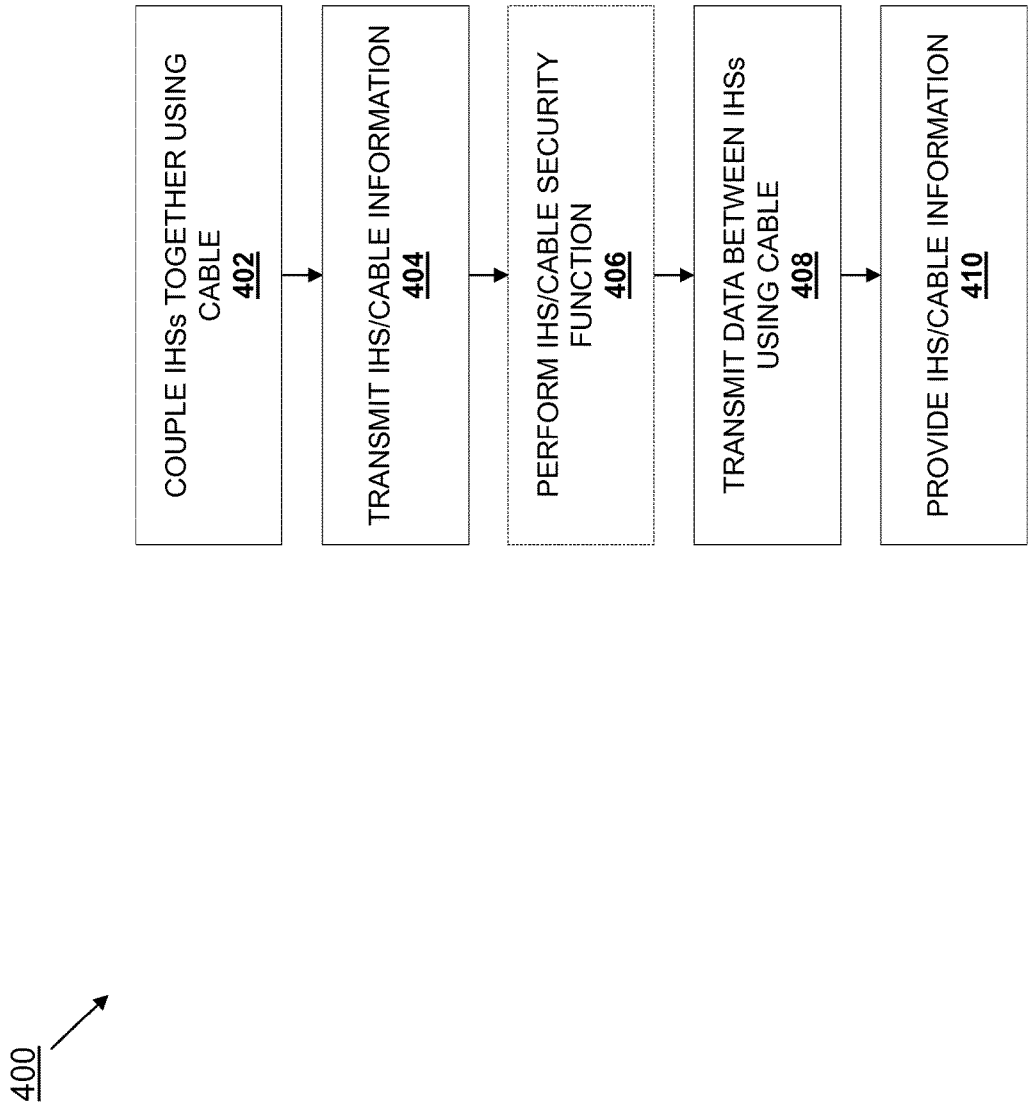
FIG. 4 is a flow chart illustrating an embodiment of a method for cable management and security.

Referring now to FIG. 4, an embodiment of a method 400 for cable management and security is illustrated. In the embodiments illustrated and discussed below, the cable 200 of FIG. 2 is used to couple the switch IHS 302 to each of the server IHS 304 and the storage IHS 306. The embodiments are provided to illustrate how the cable 200 may operate with communication systems in IHSs (i.e., the communication systems 302d and 304b in the switch IHS 302 and server IHS 304, respectively) or may operate with ports that do not include communication systems (e.g., the ports 302b and 306a in the switch IHS 302 and storage IHS 306, respectively). However, one of skill in the art in possession of the present disclosure will recognize how a plurality of the cables 200 may be utilized to couple together any plurality of IHSs in an IHS network or data center while remaining within the scope of the present disclosure. Furthermore, while the cables 200 is illustrated and described as coupling the switch IHS 302 to the server IHS 304 and storage IHS 306, one of skill in the art in possession of the present disclosure will recognize that the cable 200 may be utilized to couple server IHSs to storage IHSs, switch IHSs to wireless access point IHSs, and/or virtually any other types of IHSs together while remaining within the scope of the present disclosure.

Figure 5A:
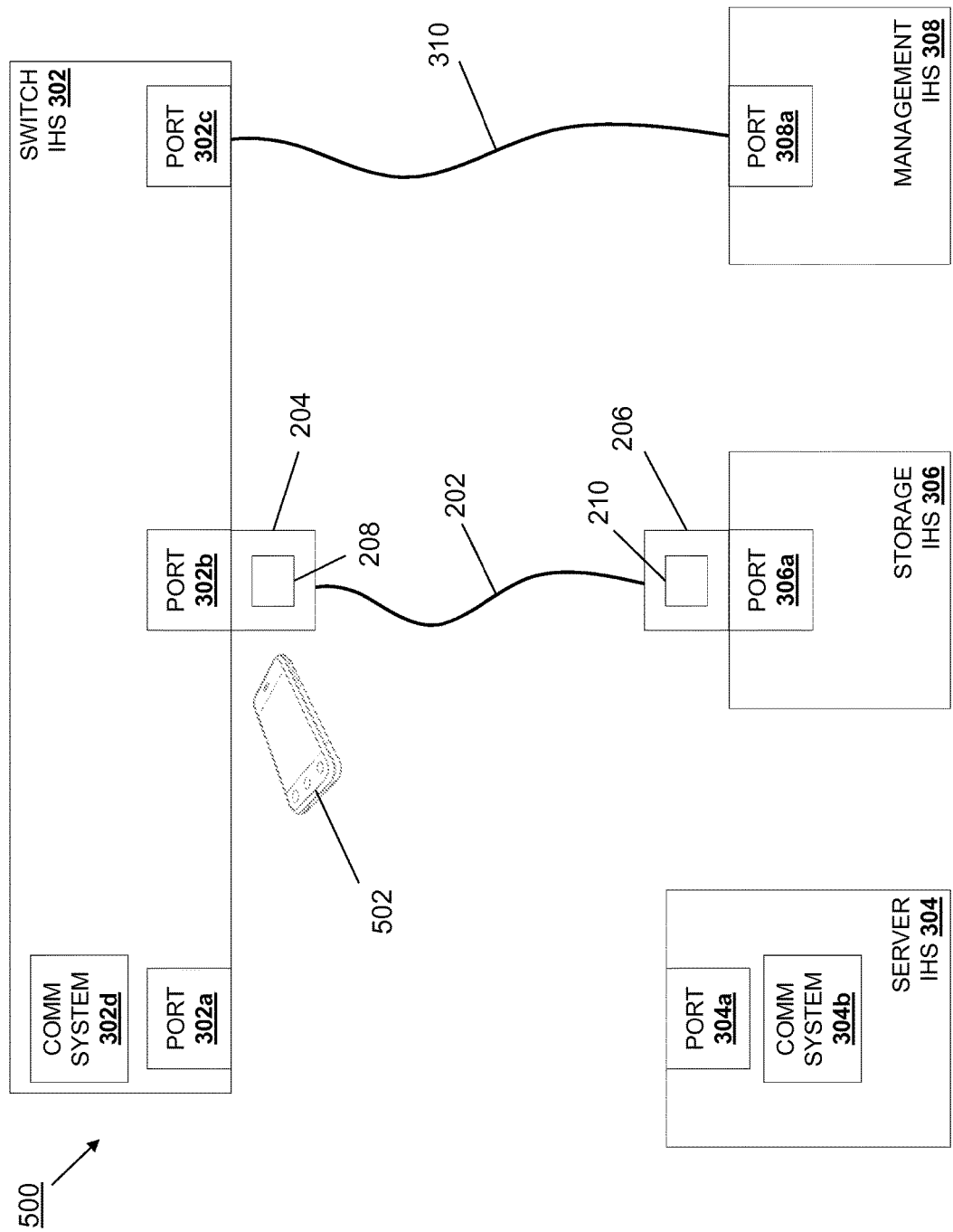
FIG. 5*a* is a schematic view illustrating an embodiment of the cable of FIG. 2 connecting IHSs in the IHS network of FIG. 3 and an administrator device transmitting information with the cable.
Figure 5B:
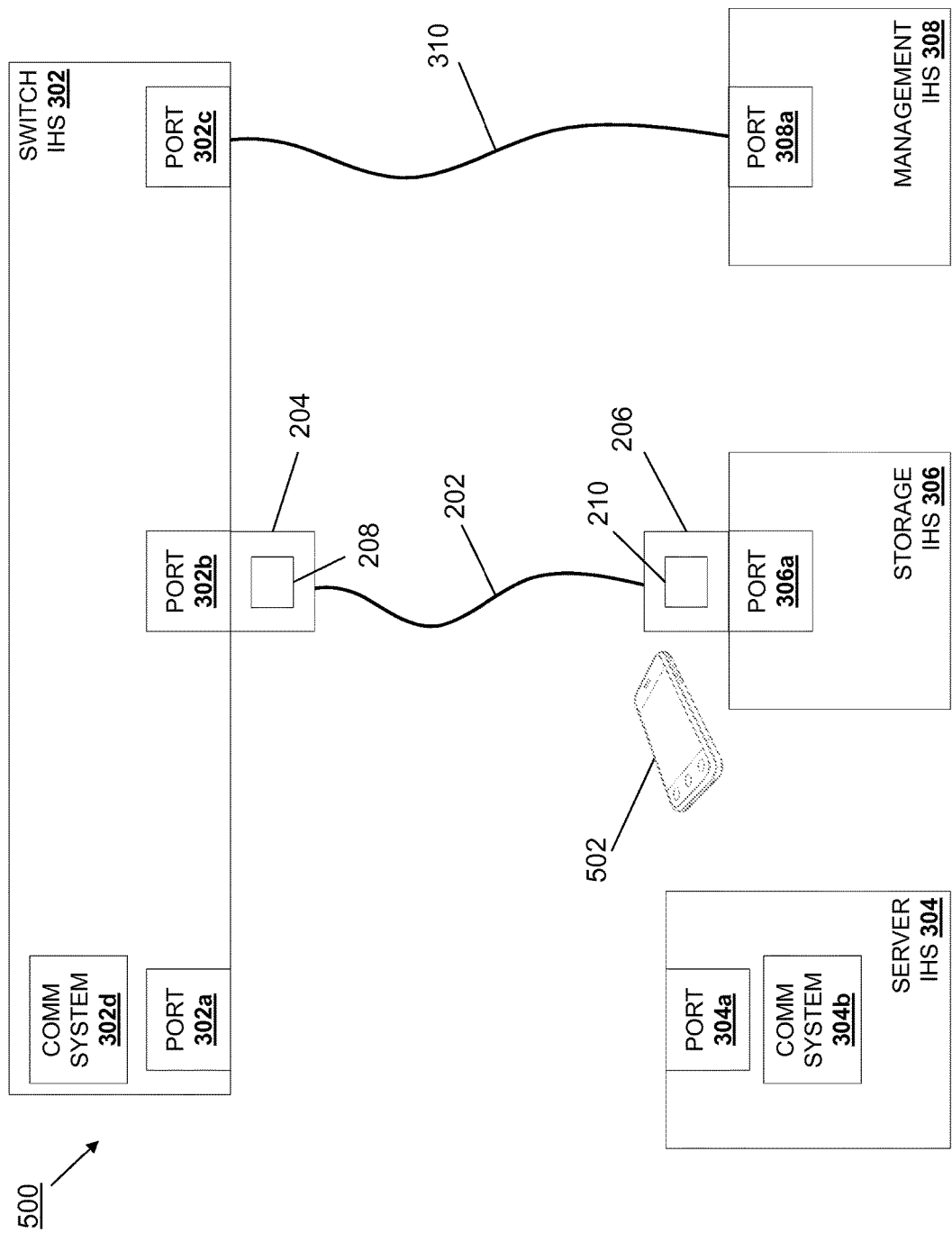
FIG. 5*b* is a schematic view illustrating an embodiment of the cable of FIG. 2 connecting IHSs in the IHS network of FIG. 3 and an administrator device transmitting information with the cable.
Figure 6:
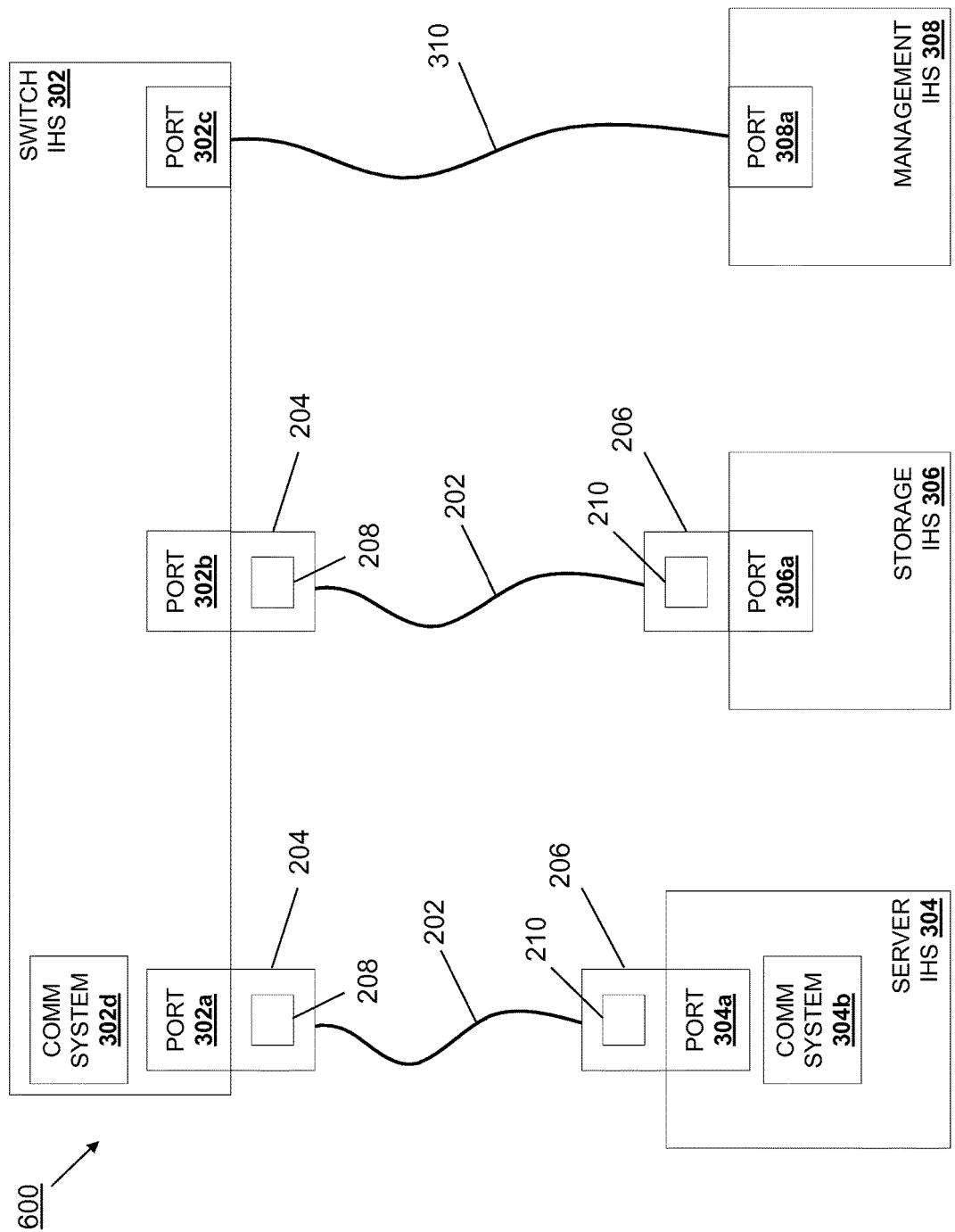
FIG. 6 is a schematic view illustrating an embodiment of the cable of FIG. 2 connecting IHSs in the IHS network of FIG. 3.

Referring now to FIGS. 2, 4, 5a, 5b, and 6, the method 400 begins at block 402 where IHSs are coupled together using the cable. FIGS. 5a and 5b illustrate a cable management and security system 500 that is provided using the cable 200 to couple together the switch IHS 302 and the storage IHS 306. In the illustrated embodiment, the connector 204 on the cable 200 has been engaged with the port 302b on the switch IHS 302, and the connector 206 on the cable 200 has been engaged with the port 306a on the storage IHS 306 in order to couple the switch IHS 302 to the storage IHS 306. FIG. 6 illustrates a cable management and security system 600 that is provided using the cable 200 to couple together the switch IHS 302 and the server IHS 304. In the illustrated embodiment, the connector 204 on the cable 200 has been engaged with the port 302a on the switch IHS 302, and the connector 206 on the cable 200 has been engaged with the port 304a on the server IHS 304 in order to couple the switch IHS 302 to the server IHS 304. As is known in the art, the cable body 202 that extends between the switch IHS 302 and storage IHS 306 or server IHS 304 to couple them together may be relatively long (25 meters, 50 meters, 100 meters, and more), and may run through IHS racks, ceilings, between floors of buildings, between buildings, and/or otherwise may couple together remotely positioned IHSs. While not illustrated, as discussed above the cable body 202 may include communication systems at any position along its length, and the location of communication systems included in the cable body 202 may be marked or otherwise indicated when the communication systems are not otherwise visible or distinguishable along the cable body 202.

The method 400 then proceeds to block 404 where IHS/cable information is transmitted. Referring first to FIGS. 5a and 5b, an embodiment of block 404 is illustrated that provides an example of how the IHS/cable information may be transmitted with and, in some embodiments stored in, the communication system(s) in the cable 200 when no communications systems are provided in the IHSs that are coupled together by that cable 200. For example, FIGS. 5a and 5b illustrate the cable 200 coupling together the switch IHS 302 and the storage IHS 306 via their respective ports 302b and 306a, each of which is not provided with a corresponding communication system, as discussed above. As discussed below, a management device 502 that includes a communication system may be configured to communicate with the communication system(s) in the cable 200 and may be used to transmit IHS/cable information for storage in the communication system(s) in the cable 200.

For example, the cable management and security system 500 of FIGS. 5a and 5b includes a management device 502 that is illustrated and described below as a portable IHS such as, for example, a mobile phone. However, one of skill in the art in possession of the present disclosure will recognize that the management device 502 may be a variety of portable and/or other IHSs known in the art that are configured to provide the functionality of the management device 502 discussed below while remaining within the scope of the present disclosure. The management device 502 includes a communication system that is configured to communicate with the communication system(s) in the cable 200. In the embodiments discussed below, the communication system in the management device 502 is provided using an NFC system that may include an NFC processing device, an NFC memory device, and/or a variety of other NFC components known in the art. However, other communication systems such as, for example, Bluetooth communication systems, Bluetooth Low Energy (BLE) communication systems, Wi-Fi Direct communication systems, and/or a variety of other communication systems capable of providing the functionality discussed below are envisioned as falling within the scope of the present disclosure.

In some embodiments of block 404, the management device 502 may retrieve cable information from the cable 200. The communication system in the management device 502 may communicate with the communication system(s) in the cable 200 to retrieve cable information that is stored in the communication system(s) and that provides details about the cable 200 such as, for example, cable length information that describes the length of the cable 200; cable quality information that describes the category characteristics of the cable 200, the connector characteristics of the cable 200, the transmission rate characteristics of the cable 200, the data transmission medium characteristics of the cable 200, and/or a variety of other cable quality characteristics known in the art; and/or any other information about the cable that was available prior to the deployment of the cable 200 to couple together the switch IHS 302 and the storage IHS 306. For example, the management device 502 may include a management application that is stored on the management device 502 and that is configured to retrieve the cable information at block 404 in response to positioning the management device 502 adjacent a communication system in the cable 200 (e.g., the communication system 208 in the connector 204, the communication system 210 in the connector 206, and/or any of the communications systems 212a-c in the cable body 202) such that the management application may use the communication system in the management device 502 to communicate with the communication system(s) in the cable 200.

While the retrieval of cable information by the management device 502 from the cable 200 is illustrated as being performed while the cable 200 is connected to the switch IHS 302 and storage IHS 306, the retrieval of cable information may be performed using the management device 502 prior to the deployment of the cable 200 in the IHS network 300 (e.g., prior to its connection to the switch IHS 302 and the storage IHS 306). Following the retrieval of the cable information, the management device 502 may operate to provide that cable information to the management IHS 308. For example, the management application executing on the management device 502 may use a wireless communication system such as, for example, a Wi-Fi communication system, to transmit the cable information retrieved at block 404 to the management IHS 308 (e.g., via a wireless network that is coupled to the management IHS 308) such that the management IHS 308 may store that cable information. As discussed in further detail below, the retrieval of cable information from cable(s) 200 that are available for the IHS network 300, and the storage of that cable information by the management IHS 308, provides for the ability to quickly and easily inventory each cable 200 that is available and/or deployed in the IHS network 300 to, for example, provide for more efficient use of the cables 200 that are available for use in the IHS network 300.

In some embodiments of block 404, the management device 502 may provide IHS information to the cable 200. The communication system in the management device 502 may communicate with the communication system(s) in the cable 200 to provide IHS information for storage in the communication system(s) in the cable 200 such as, for example, identifying information about the IHS to which the cable 200 is connected (e.g., an IHS identifying number, an IHS type, an IHS physical location (e.g., in a data center), etc.), identifying information about the port to which the cable 200 is connected (e.g., a port number, a port type, port characteristics, etc.), and/or a variety of other IHS information known in the art. In some embodiments, the IHS information may be provided to the management application on the management device 502 by an IHS network administrator and/or other entity that is deploying the cable 200 in the IHS network. In some examples, an IHS network administrator may provide information to the management application about the ports and IHSs that the cable 200 is (or will be) connected to, and the management application may then communicate that information to communication system(s) in the cable 200. In other examples, the management device 502 may be used to capture information (e.g., via a camera on the management device 502) about the ports and IHSs that the cable 200 will be connected to, and the management application may then communicate that information to communication system(s) in the cable 200. In some embodiments, any or all of the IHS information provided by the management device 502 to the communication system(s) in the cable 200 may also be provided to the management IHS 308. For example, the management application executing on the management device 502 may use a wireless communication system such as, for example, a Wi-Fi communication system, to transmit the IHS information provided at block 404 to the management IHS 308 (e.g., via a wireless network that is coupled to the management IHS 308) such that the management IHS 308 may store that IHS information, in some cases in association with the cable information provided for that cable, discussed in further detail below.

FIG. 5a illustrates an embodiment in which the management device 502 is positioned adjacent the communication system 208 in the connector 204 such that the management application may use the communication system in the management device 502 to provide IHS information to the communication system 208. For example, the management device 502 may be positioned within a communication range of its communication system and the communication system 208 in the connector 204, and the user of the management device 502 may instruct the management application to provide available IHS information about the switch IHS 302, the port 302b, the storage IHS 306, the port 306a, and/or any other relevant IHS information, to the communication system 208. FIG. 5b illustrates an embodiment in which the management device 502 is positioned adjacent the communication system 210 in the connector 206 such that the management application may use the communication system in the management device 502 to provide IHS information to the communication system 210. For example, the management device 502 may be positioned within a communication range of its communication system and the communication system 210 in the connector 206, and the user of the management device 502 may instruct the management application to provide available IHS information about the switch IHS 302, the port 302b, the storage IHS 306, the port 306a, and/or any other relevant IHS information, to the communication system 210. The management device 502 may operate to provide IHS information to any of the communication systems 212a-c in the cable body 202 in a similar manner.

In some embodiments, the communication system(s) in the cable 200 may transmit the IHS information between each other. Referring to FIG. 5a, the user of the management device 502 may instruct the management application to provide available IHS information about the switch IHS 302, the port 302b, and/or any other IHS information relevant to the connection of the cable 200 to the switch IHS 302, to the communication system 208. In some embodiments, the communication system 208 may transmit that IHS information wirelessly to the other communication system(s) in the cable 200. For example, the communication system 208 may utilize its NFC system to transmit the IHS information to other communication system(s) in the cable 200 that are within a wireless communication range, and those communication system(s) may then transmit the IHS information to other communication system(s) in the cable 200 that are within a wireless communication range, and so on until the IHS information provided to the communication system 208 has been transmitted to each communication system in the cable 200.

In some embodiments, the communication system 208 may transmit the IHS information through the data transmission medium provided in the cable body 202 to the other communication system(s) in the cable 200. For example, the communication system 208 may utilize a wire or fiber optic cable in the cable body 202 such that the IHS information provided to the communication system 208 is transmitted to each communication system in the cable 200. In such embodiments, each of the communication systems in the cable 200 may be assigned an address (e.g., a reserved Ethernet address) that allows that communication system to be sent the IHS information from any another communication system in the cable. In some embodiments, a broadcast/multicast address may be assigned to communication systems 212a-c in the cable body 202 such that either or both of the communications systems 208 and 210 in the connectors 204 and 206, respectively, can provide IHS information to each of the communication systems 212a-c at once.

Similarly, referring to FIG. 5b, the user of the management device 502 may instruct the management application to provide available IHS information about the storage IHS 306, the port 306a, and/or any other IHS information relevant to the connection of the cable 200 to the storage IHS 306, to the communication system 210. In some embodiments, the communication system 210 may transmit that IHS information wirelessly to the other communication system(s) in the cable 200. For example, the communication system 210 may utilize the NFC system to transmit the IHS information to other communication system(s) in the cable 200 that are within a wireless communication range, and those communication system(s) may then transmit the IHS information to other communication system(s) in the cable 200 that are within a wireless communication range, and so on until the IHS information provided to the communication system 210 has been transmitted to each communication system in the cable 200. In some embodiments, the communication system 210 may transmit that IHS information through the data transmission medium provided in the cable body 202 to the other communication system(s) in the cable 200. For example, the communication system 210 may utilize a wire or fiber optic cable in the cable body 202 such that the IHS information provided to the communication system 210 is transmitted to each communication system in the cable 200.

As such, any or all of the communication system(s) in the cable 200 that connects the switch IHS 302 and the storage IHS 306 may store the cable information that includes details about the cable 200 and/or the IHS information that includes details about the connectivity of the cable 200 to the switch IHS 302 and the storage IHS 206 that is discussed above. FIGS. 5a and 5b illustrate how that information may be provided to the communication system(s) in the cable 200 when the cable is connecting IHSs and/or ports that are not configured to communicate with the communication system(s) in the cable 200. Thus, FIGS. 5a and 5b provide one example of the use of the cable 200 of the present disclosure with conventional IHSs having conventional ports in order to provide the enhanced cable management and security system of the present disclosure in conventional IHS networks.

Referring now to FIG. 6, an embodiment of block 404 is illustrated that provides an example of how the IHS/cable information may be transmitted and stored in communication system(s) in the cable 200 when communications systems are provided in the IHSs that are coupled together using that cable 200. For example, FIG. 6 illustrates the cable 200 coupling together the switch IHS 302 and the server IHS 304 via their respective ports 302a and 304a, each of which is provided with a corresponding communication system 302d and 304b, as discussed above.

In some embodiments of block 404, the communication system 302d in the switch IHS 302 and/or the communication system 304b in the server IHS 304 may retrieve cable information from the cable 200. The communication systems 302d and/or 304b may communicate with the communication system(s) in the cable 200 to retrieve cable information that is stored in the communication system(s) and that provides details about the cable 200 such as, for example, cable length information that describes the length of the cable 200; cable quality information that describes the category characteristics of the cable 200, the connector characteristics of the cable 200, the transmission rate characteristics of the cable 200, the data transmission medium characteristics of the cable 200, and/or a variety of other cable quality characteristics known in the art; and/or any other information about the cable that is available prior to the deployment of the cable 200 to couple together the switch IHS 302 and the server IHS 304. For example, the communication system 302d may be configured to retrieve the cable information at block 404 from the communication system 208 in response to the connection of the connector 204 to the port 302a, and communication system 304b may be configured to retrieve the cable information at block 404 from the communication system 210 in response to the connection of the connector 206 to the port 304a).

In some embodiments, any or all of the cable information retrieved by the communication systems 302d and/or 304b from the communication system(s) in the cable 200 may also be provided to the management IHS 308. For example, the switch IHS 302 may provide the cable information through the cable 310, and the server IHS 304 may provide the cable information through the cable 200, the switch IHS 302, and the cable 310, such that the management IHS 308 may receive and store that cable information. While the retrieval of cable information by the communication systems 302d and/or 304b from the cable 200 is illustrated as being performed while the cable 200 is connected to the switch IHS 302 and server IHS 304, the retrieval of cable information may be performed prior to the deployment of the cable 200 in the IHS network 300 (e.g., prior to its connection to the switch IHS 302 and the server IHS 304) substantially as described above using the management device 502, and may be provided to the management IHS 308 substantially as described above.

In some embodiments of block 404, the IHSs may provide IHS information to the cable 200. The communication system 302d in the switch IHS 302 and/or the communication system 304b in the server IHS 304 may communicate with the communication system(s) in the cable 200 to provide IHS information for storage in the communication system(s) in the cable 200 such as, for example, identifying information about the IHS to which the cable 200 is connected (e.g., an IHS identifying number, an IHS type, an IHS physical location (e.g., in a data center), etc.), identifying information about the port to which the cable 200 is connected (e.g., a port number, a port type, port characteristics, etc.), and/or a variety of other IHS information known in the art. In some embodiments, any or all of the IHS information provided by the communication systems 302d and/or 304b to the communication system(s) in the cable 200 may also be provided to the management IHS 308. For example, the switch IHS 302 may provide the IHS information through the cable 310, and the server IHS 304 may provide the IHS information through the cable 200, the switch IHS 302, and the cable 310, such that the management IHS 308 may receive store that IHS information, in some cases in association with the cable information provided for that cable, discussed in further detail below.

FIG. 6 illustrates how the communication system 208 in the connector 204 may be positioned within a communication range of the communication system 302d of the switch IHS 302 by engaging the connector 204 with the port 302a such that the communication system 302d provides available IHS information about the switch IHS 302, the port 302b, any other IHS information relevant to the connection of the cable 200 to the switch IHS 302, to the communication system 208. FIG. 6 also illustrates how the communication system 210 in the connector 206 may be positioned within a communication range of the communication system 304 of the server IHS 304 by engaging the connector 206 with the port 304a such that the communication system 304d provides available IHS information about the server IHS 304, the port 304a, any other IHS information relevant to the connection of the cable 200 to the server IHS 304, to the communication system 210.

In some embodiments, the communication system(s) in the cable 200 may transmit the IHS information between each other. The communication system 208 may transmit IHS information received from the communication system 302d wirelessly to the other communication system(s) in the cable 200. For example, the communication system 208 may utilize the NFC system to transmit the IHS information to other communication system(s) in the cable 200 that are within a wireless communication range, and those communication system(s) may then transmit the IHS information to other communication system(s) in the cable 200 that are within a wireless communication range, and so on until the IHS information provided to the communication system 208 has been transmitted to each communication system in the cable 200. In some embodiments, the communication system 208 may transmit that IHS information through the data transmission medium provided in the cable body 202 to the other communication system(s) in the cable 200. For example, the communication system 208 may utilize a wire or fiber optic cable in the cable body 202 such that the IHS information provided to the communication system 208 is transmitted to each communication system in the cable 200.

Similarly, the communication system 210 may transmit IHS information received from the communication system 304b wirelessly to the other communication system(s) in the cable 200. For example, the communication system 210 may utilize the NFC system to transmit the IHS information to other communication system(s) in the cable 200 that are within a wireless communication range, and those communication system(s) may then transmit the IHS information to other communication system(s) in the cable 200 that are within a wireless communication range, and so on until the IHS information provided to the communication system 210 has been transmitted to each communication system in the cable 200. In some embodiments, the communication system 210 may transmit that IHS information through the data transmission medium provided in the cable body 202 to the other communication system(s) in the cable 200. For example, the communication system 210 may utilize a wire or fiber optic cable in the cable body 202 such that the IHS information provided to the communication system 210 is transmitted to each communication system in the cable 200.

In some embodiments, the management IHS 308 may provide some of the IHS information to the communication system(s) in the cable 200. For example, the communication system 304b in the server IHS 304 may provide information about the server IHS 304 and the port 304a to the communication system 210 in the connector 206 of the cable 200, and the server IHS 304 may also send the IHS information related to that connection (i.e., that the connector 206 on the cable 200 is connected to the port 304a on the server IHS 304) to the management IHS 208 (e.g., through the cable 200, the switch IHS 302, and the cable 310). The management IHS 308 may then send the IHS information related to the connection of the switch IHS 302 and server IHS 304 by the cable 200 to the communication system 302d in the switch 302, and the communication system 302d may provide that IHS information to the communication system 208 in the connector 204.

As such, any or all of the communication system(s) in the cable 200 connecting the switch IHS 302 and the server IHS 304 may store the cable information that includes details about the cable 200 and/or the IHS information that includes details about the connectivity of the cable 200 to the switch IHS 302 and server IHS 304 that is discussed above. FIG. 6 illustrates how that information may be provided to the communication system(s) in the cable 200 when the cable is connecting IHSs and/or ports that are configured to communicate with the communication system(s) in the cable 200. Thus, FIG. 6 provide one example of the use of the cable 200 of the present disclosure with IHSs having communication systems associated with their ports in order to provide the enhanced cable management and security system of the present disclosure in IHS networks.

The method 400 then proceeds to optional block 406 where an IHS/cable security function may be performed. In some embodiments, the communication system(s) in the cable 200 may include security information that may be used by the IHSs to enforce a security policy in the IHS network 300. For example, the communication system 208 in the connector 204, the communication system 210 in the connector 206, and/or the communication systems 212a-c in the cable body 202 may include a security certificate (e.g., stored in a memory of the communication system) that may be used by a connected IHS to determine whether the cable 200 is authorized to transmit data with that connected IHS. In a specific example involving the connection of the switch IHS 302 and the server IHS 304, upon connection of the connector 204 to the port 302a, the communication system 302d in the switch IHS 302 may operate to retrieve the security certificate from the communication system 208 in the connector 204 and determine whether that security certificate has been signed by a certificate authority. If the security certificate is retrieved from the communication system 208 and has been signed by a certificate authority, the switch IHS 302 may enable the transmission of data between the port 302a and the cable 200, while if the security certificate is not retrieved from the communication system 208 or has not been signed by a certificate authority, the switch IHS 302 may disable the transmission of data between the port 302a and the cable 200. Similarly, upon connection of the connector 206 to the port 304a, the communication system 304b in the server IHS 304 may operate to retrieve the security certificate from the communication system 210 and determine whether that security certificate has been signed by a certificate authority. If the security certificate is retrieved from the communication system 210 and has been signed by a certificate authority, the server IHS 304 may enable the transmission of data between the port 304a and the cable 200, while if the security certificate is not retrieved from the communication system 210 or has not been signed by a certificate authority, the server IHS 304 may disable the transmission of data between the port 304a and the cable 200.

In some embodiments, the communication system(s) in the IHSs may include security information that may be used by the cable to enforce a security policy in the IHS network 300. For example, the communication system 302d in the switch IHS 302 and/or the communication system 304b in the server IHS 304 may include a security certificate (e.g., stored in a memory of the communication system) that may be used by the cable 200 to determine whether the IHS is authorized to transmit data with that cable. In a specific example involving the connection of the switch IHS 302 and the server IHS 304, upon connection of the connector 204 to the port 302a, the communication system 208 in the connector 204 may operate to retrieve the security certificate from the communication system 302d in the switch IHS 302 and determine whether that security certificate has been signed by a certificate authority. If the security certificate is retrieved from the communication system 302d and has been signed by a certificate authority, the communication system 208 may enable the transmission of data between the port 302a and the connector 204 (or otherwise through the cable 200), while if the security certificate is not retrieved from the communication system 302d or has not been signed by a certificate authority, the communication system 208 may disable the transmission of data between the port 302a and the connector 204 (or otherwise through the cable 200). Similarly, upon connection of the connector 206 to the port 304a, the communication system 210 in the connector 206 may operate to retrieve the security certificate from the communication system 304b in the server IHS 304 and determine whether that security certificate has been signed by a certificate authority. If the security certificate is retrieved from the communication system 304b and has been signed by a certificate authority, the communication system 210 may enable the transmission of data between the port 304a and the connector 206 (or otherwise through the cable 200), while if the security certificate is not retrieved from the communication system 304b or has not been signed by a certificate authority, the communication system 210 may disable the transmission of data between the port 304a and the connector 206 (or otherwise through the cable 200).

In some embodiments, the cable 200 may be configured to perform cable security functions at block 406 independent of the IHSs. For example, the communication system 208 in the connector 204 and the communication system 210 in the connector 206 (or any plurality of communication systems at any locations in the cable 200) may be used to perform encryption and decryption operations on data transmitted through the cable 200 (e.g., as discussed below with reference to block 408 of the method). In some embodiments, the communication system 208 may maintain public and private keys in accordance with the Diffie-Hellman protocol and use that protocol encapsulated in frames exchanged with the communication system 210 to negotiate encryption session keys. The key exchange may be initiated when the communication systems are initialized, periodically, or as needed if an error condition causes them to become desynchronized.

Once the communication systems 208 and 210 have established a session key, they may use encryption, message authentication code (MAC) functions, and sequence numbers to secure data communication against eavesdropping, tampering, and replay attacks. For example, to transmit data the originating communication system 208 may apply a secure hash function such as SHA-256 to a sequence number concatenated with the data, type, and address portions of each data communication frame. The hashed data and hash value may then be encrypted using a standard encryption algorithm such as the Advanced Encryption Standard (AES)

in cipher-block chaining mode with Public Key Cryptography Standards (PKCS) padding. The encrypted data may then be sent with the initialization vector in a frame to the destination communication system 210. Once that communication system 210 receives the encrypted data, it may decrypt the data frame using the session key. If the data does not match its expected hash the frame may then be discarded. If the sequence number is below the expected sequence number the frame may also be discarded, otherwise the expected sequence number will be incremented and the original data may be forwarded to the IHS 304.

It is generally possible to compress data prior to encryption. On reasonably reliable networks, several data frames may share the same encryption initialization vector. Since the MAC function will insure the data integrity, in some embodiments standard error checking codes need not be sent with the frame, and the data payload size may be increased proportionally. In embodiments that have communication systems only at the ends of a cable (e.g., the communication systems 208 and 210), as well as particular IHS systems connected to either end of the cable, portions of the frame typically used for addressing may be compressed or eliminated such that the overall bandwidth required by a sequence of encrypted data frames does not exceed that of standard data-link layer protocols.

One of skill in the art will recognize that such operations provide for a self-encrypting cable that off-loads encryption/decryption operations from the IHSs and simplifies the management of such operations, particularly when IHSs are managed by different organizational units. While a few examples have been provided, one of skill in the art in possession of the present disclosure will recognize that cables may be secured using a variety of key-exchange, encryption, and message authentication algorithms known in the art while remaining within the scope of the present disclosure.

Thus, the cable and/or its connected IHSs may utilize security information to enforce either or both of IHS-side and cable-side security policies by performing IHS/cable security functions that operate to prevent the transmission of data between the cable and the IHSs if security information cannot be retrieved or is not verified and enforcing encryption standards. While the examples above discuss the use of security certificates signed by a certificate authority, one of skill in the art in possession of the present disclosure will recognize that public/private key pairs, passcodes, and/or a variety of other security information may be utilized by the cable and/or IHSs discussed above with remaining within the scope of the present disclosure.

The method 400 the proceeds to block 408 where data is transmitted between IHSs using the cable. Following the coupling of the IHSs at block 402, and in some embodiments following the performance of the security function at optional block 406 to ensure that the cable and the IHS are authorized to transmit data with each other, the cables 200 may be used to transmit data between the switch IHS 302 and each of the server IHS 304 and the storage IHS 306.

The method 400 then proceeds to block 410 where IHS/cable information is provided. In various embodiments, the cable information and/or IHS information that was stored the communication systems in the cable 200 and/or in the management IHS 308 as discussed above may be provided to a variety of requesting entities, a few examples of which are included below. As described below, the cable information and/or IHS information greatly enhances the management of cables in an IHS network, providing for more efficient utilization of cables, more efficient troubleshooting of cable problems, and/or a variety of other benefits that will be recognized by one of skill in the art in possession of the present disclosure.

In several embodiments, the utilization of the cable(s) 200 in an IHS network allow an IHS network administrator to retrieve cable information and/or IHS information about any cable of interest in the IHS network. FIG. 7 illustrates an embodiment of a management IHS 700 including a display 702 that is displaying a cable inventory screen 704. In the illustrated embodiment, the cable inventory screen 704 includes a cable inventory section 706 that includes information associated with a plurality of cables. As can be seen, each of the plurality of entries in the cable inventory section 706 includes an cable identifier 706a for a cable, a cable length 706b of the cable, a cable quality 706c of the cable, one or more connected devices 706d that the cable is connected to, detected errors 706e associated with the cable, and a detected latency 706f associated with the cable. As discussed above, cable information such as the cable IDs 706a, cable lengths 706b, and cable quality 706c may be retrieved from the cables 200 and provided to the management IHS 308/700 as discussed above with reference to block 404, and IHS information such as the one or more connected devices 706d may be provided to the management IHS 308/700 as discussed above with reference to block 404.

Furthermore, the IHSs and/or the communication systems in the cable 200 may report data transmission information to the management IHS 308/700 to allow the management IHS 308/700 to detect errors associated with the cable 200 such as, for example, a lack of data flow, a disconnection, a number of recent disconnections, a number of recent losses of connectivity, a number of collisions, a number of dropped frames, and/or other errors known in the art. Furthermore, the IHSs and/or the communication systems in the cable 200 may report data transmission information to the management IHS 308/700 to allow the management IHS 308/700 to detect latency issues such as, for example, an increased amount of time it takes data to traverse the cable 200.

In some embodiments, the communication systems in the cable 200 allow the cable 200 to be used to determine a variety of data transmission characteristics of the cable 200 that may be shared with the management IHS 308/700 and displayed to an IHS network administrator. For example, the communication systems in the cable 200 may be used to determine a latency associated with the cable 200 by sending data (e.g., frames) between each other (e.g., from the communication system 208 in the connector 204 to the communication system 210 in the connector 208) and measuring the time it takes for that data to travel between those communication systems. Furthermore, such techniques may be used by communication systems in the cable body 202 to determine and report a location along the cable body 202 that may be responsible for latency. Further still, communication systems in the cable body 202 may operate to self-identify their location along the cable body 202 based on relative latencies determined between themselves and any of the other communication systems in the cable 200, and that self-identified location may be reported to the management IHS 308/700, the management device 502, and/or the other communication systems. The determination of latency in the cable 200 by the communication systems may be periodically performed in a self-diagnostic mode, or may be performed in response to instructions from the management IHS 308/700 or the management device 502.

In another example, the communication systems in the cable 200 may be used to determine an effective bandwidth associated with the cable 200 by monitoring traffic and injecting additional data (e.g., frames) as needed until the link provided by the cable 200 is at capacity. The determination of the effective bandwidth of the cable 200 by the communication systems may be periodically performed automatically, or may be performed in response to instructions from the management IHS 308/700 or the management device 502 to enter a self-diagnostic mode. By automatically generating such traffic, the amount of network traffic associated with IHS-initiated data requests may be obscured from an eavesdropper. While a few examples of the determination of data transmission characteristics associated with the cable 200 have been provided, one of skill in the art in possession of the present disclosure will recognize that a wide variety of data transmission characteristics may be determined by the communication systems in the cable 200 and reported to the management IHS 308/700, the management device 502, and/or the other communication systems while remaining within the scope of the present disclosure.

Using the cable inventory screen 704, an IHS network administrator is provided IHS/cable information that allows the IHS network administrator to determine each cable available in the IHS network, which devices are connected to which cables, which cables may be disconnected from an IHS on one or both ends, which cables are associated with errors, which cables are experiencing data latencies (e.g., illustrated as being reported by underlining latencies that exceed an expected amount based on, for example, the length of the cable), and/or a variety of other IHS/cable information known in the art. As such, the IHS network administrator may quickly and easily determine the IHS network's need for new cables (e.g., by providing a comprehensive inventory of each cable, connected or in storage, that is available), reallocate cables, reconnect disconnected cables, and/or utilize the IHS/cable information to recognize a wide variety of other benefits that will be apparent to one of skill in the art in possession of the present disclosure. The cable inventory screen 704 allows an IHS network administrator to quickly determine whether a cable has been connected to an unauthorized or unknown device, and can be utilized to prevent unauthorized or unknown devices from secretly accessing the IHS network. Similarly, detected disconnections and/or latency issues associated with a cable may be utilized to notify an IHS network administrator to inspect the length of the cable for tampering.

FIG. 8 illustrates an embodiment of the management IHS 700 including the display 702 displaying an IHS/cable connectivity screen 800. In the illustrated embodiment, the IHS/cable connectivity screen 800 includes a port connectivity section 802 that includes information associated with a plurality of ports on the switch IHS 302. As can be seen, each of the plurality of entries in the port connectivity section 802 includes a port identifier 802a for a port, a cable identifier 802b for the cable connected to the port, a cable length 802c of the cable connected to the port, a connected device 802d that the port is connected to through the cable, detected errors 802e associated with the port and cable, and a detected latency 802f associated with the cable. As discussed above, cable information such as the cable IDs 802b and cable lengths 802c may be retrieved from the cables 200 and provided to the management IHS 308/700 as discussed above with reference to block 404, and IHS information such as the connected devices 706d may be provided to the management IHS 308/700 as discussed above with reference to block 404. Furthermore, the cable and/or IHSs may report data transmission information over their ports to which the cables are connected to the management IHS 308/700 to allow the management IHS 308/700 to detect errors and/or determine latency issues. Using the IHS/cable connectivity screen 800, an IHS network administrator is provided IHS/cable information that allows the IHS network administrator to determine each cable connected to a port on an IHS, which devices are connected to the other ends of those cables, which cables may be disconnected from the IHS, which cables are associated with errors, which cables are experiencing data latency issues (e.g., illustrated as being reported by underlining latencies that exceed an expected amount based on, for example, the length of the cable), and/or a variety of other IHS/cable information known in the art. As such, the IHS network administrator may quickly and easily determine the IHSs need for new cables, reallocate cables, reconnect disconnected cables, and/or utilize the IHS/cable information to recognize a wide variety of other benefits that will be apparent to one of skill in the art in possession of the present disclosure.

In another embodiment, an IHS network administrator may use a management device such as, for example, the portable or mobile management device 502 illustrated in FIGS. 5 and 5b, to retrieve the IHS/cable information at block 410. For example, the IHS network administrator may utilize the communication system in then management device 502 to retrieve the cable information and/or IHS information from any communication system in any cable 200 in the IHS network by positioning the management device 502 adjacent a communication system in the cable 200 such that it is within a communication range, and using the management application to retrieve the cable information and/or the IHS information from the communication system in the cable 200. In one example, an IHS network administrator may retrieve cable information and/or IHS information from the communication system in a connector on a cable 200 when that connector has been disconnected from a port on an IHS, and allows the IHS network administrator to quickly and easily determine which port on which IHS that connector should be reconnected to. In another example, an IHS network administrator may retrieve cable information and/or IHS information from the communication system in a first connector on a cable 200 when that first connector is connected to a port on an IHS and the second connector on the other end of the cable 200 is connected to an unknown IHS, and allows the IHS network administrator to quickly and easily determine which port on which IHS that the second connector is connected to. In another example, an IHS network administrator may retrieve cable information and/or IHS information from the communication system in a cable body 202 on a cable 200 when the cable body 202 is part of a bundle of cable bodies, and allows the IHS network administrator to quickly and easily determine which ports on which IHSs that the connectors on either end of that cable body are connected to. While a few examples have been provided, one of skill in the art in possession of the present disclosure will recognize that a wide variety of other uses of the cable information and/or IHS information stored in the communication systems of the cable will fall within the scope of the present disclosure.

Thus, systems and methods have been described that provide for cable management and security by providing for the storage of cable information and connected-IHS information in both the cables that couple IHSs together, and in management IHSs, such that that information may be retrieved to manage the cables used in an IHS network. Furthermore, such communication systems in the cable and IHSs allow for the enforcement of security policies that ensure that only authorized cables are used to connect IHSs, and/or only authorized IHSs are connected to the cables.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A cable management system, comprising:
a cable that is configured to transmit data between information handling systems (IHSs), wherein the cable includes a first end and a second end that is opposite the cable from the first end;
a first connector that is located on the first end of the cable and that is configured to couple the cable to a first IHS;
a second connector that is located on the second end of the cable and that is configured to couple the cable to a second IHS;
a first communication system that is located adjacent the first end of the cable, wherein the first communication system includes a first memory and a first processor that is coupled to the first memory and that is configured to:
receive and store first IHS identifying information about the first IHS in the first memory when the first connector is coupled to the first IHS; and
provide the first IHS identifying information to a management device when the first connector is not coupled to the first IHS; and
a second communication system that is located adjacent the second end of the cable, wherein the second communication system includes a second memory and a second processor that is coupled to the second memory that is configured to:
receive and store second IHS identifying information about the second IHS in the second memory when the second connector is coupled to the second IHS; and
provide the second IHS identifying information to the management device.

2. The cable management system of claim 1, wherein the first IHS identifying information and the second IHS identifying information include at least one of an IHS identifying number, an IHS type, an IHS physical location, a port number, a port type, and a port characteristic.

3. The cable management system of claim 1, wherein the second processor included in the second communication system is configured to;
send the second IHS identifying information over the cable to the first communication system; and
receiving the first IHS identifying information over the cable from the first communication system.

4. The cable management system of claim 1, wherein the first processor included in the first communication system is configured to;
receive the first IHS identifying information wirelessly from a mobile device.

5. The cable management system of claim 1, wherein the first processor included in the first communication system is configured to:
retrieve a security certificate that is stored in the first communication system; and
provide the security certificate to the first IHS to allow the cable to transmit data with the first IHS.

6. The cable management system of claim 1, wherein the first processor included in the first communication system is configured to:
receive a security certificate from the first IHS;
verify the security certificate and, in response, permit the first IHS to transmit data with the cable.

7. The cable management system of claim 1, wherein the first processor included in the first communication system and the second processor included in the second communication system are configured to:
negotiate one or more encryption session keys and use the one or more encryption session keys to perform an encryption operation on data transmitted through the cable.

8. An information handling system (IHS) network, comprising:
a first IHS;
a second IHS;
a cable connecting the first IHS and the second IHS, wherein the cable includes:
a first connector that is located on a first end of the cable and that connects the cable to the first IHS;
a second connector that is located on a second end of the cable and that connects the cable to the second IHS;
a first communication system that is located adjacent the first end of the cable, wherein the first communication system includes a first memory and a first processor that is coupled to the first memory and that;
receives and stores first IHS identifying information about the first IHS in the first memory when the first connector is coupled to the first IHS; and
a second communication system that is located adjacent the second end of the cable, wherein the second communication system includes a second memory and a second processor that is coupled to the second memory and that;
receives and stores second IHS identifying information about the second IHS in the second memory when the second connector is coupled to the second IHS:
receives and stores the first IHS identifying information about the first IHS that is provided by the first communication system in the second memory; and
provides the first IHS identifying information and second IHS identifying information to a management device.

9. The IHS network of claim 8, wherein the first IHS identifying information and the second IHS identifying information include at least one of an IHS identifying number, an IHS type, an IHS physical location, a port number, a port type, and a port characteristic.

10. The IHS network of claim 8, wherein the second processor included in the second communication system sends the second IHS identifying information over the cable to the first communication system.

11. The IHS network of claim 8, wherein the first processor included in the first communication system receives the first IHS identifying information wirelessly from a mobile device.

12. The IHS network of claim 8, wherein the first processor included in the first communication system retrieves a security certificate that is stored in the first communication system and provides the security certificate to the first IHS to allow the first IHS to transmit data through the cable.

13. The IHS network of claim 8, wherein the first processor included in the first communication system receives a security certificate from the first IHS, verifies the security certificate and, in response, permits the first IHS to transmit data through the cable.

14. The IHS network of claim 8, wherein the first processor included in the first communication system and the second processor included in the second communication system negotiate one or more encryption session keys and use the one or more encryption session keys to perform an encryption operation on data transmitted through the cable.

15. A method for cable management, comprising:
coupling a first connector that is located on a first end of a cable to a first information handling system (IHS);
coupling a second connector that is located on a second end of the cable to a second IHS;
receiving, by a first communication system that is located adjacent the first end of the cable, first IHS identifying information about the first IHS and, in response, storing the first IHS identifying information;
receiving, by a second communication system that is located adjacent the second end of the cable, second IHS identifying information about the second IHS and, in response, storing the second IHS identifying information;
providing, by the first communication system, the first IHS identifying information directly to a management device when the first connector is not coupled to the first IHS; and
providing, by the second communication system, the second HIS identifying information directly to the management device.

16. The method of claim 15, wherein the first IHS identifying information and the second IHS identifying information include at least one of an IHS identifying number, an IHS type, an IHS physical location, a port number, a port type, and a port characteristic.

17. The method of claim 15, further comprising:
sending, by the second communication system, the second HIS identifying information over the cable to the first communication system; and
sending, by the first communication system, the first IHS identifying information over the cable to the second communication system.

18. The method of claim 15, further comprising:
retrieving, by the first communication system, a security certificate that is stored in the first communication system;
providing, by the first communication system, the security certificate to the first IHS; and
transmitting, by the first IHS, data through the cable in response to verifying the security certificate.

19. The method of claim 15, further comprising:
receiving, by the first communication system, a security certificate from the first IHS;
verifying, by the first communication system, the security certificate and, in response, permitting the first IHS to transmit data through the cable.

20. The method of claim 15, further comprising:
negotiating, by the first communication system and the second communication system that is located adjacent the second end of the cable, one or more encryption session keys; and
using, by the first communication system and the second communication system, the one or more encryption session keys to perform an encryption operation on data transmitted through the cable.

* * * * *